United States Patent Office 3,637,596
Patented Jan. 25, 1972

3,637,596
COPOLYMERS OF BUTADIENE AND/OR COPOLYMERIZABLE CARBOXYLIC NITRILES AND OTHER MONOMERS WHICH RESIST YELLOWING
Klaus Gulbins, Limburgerhof, Hans Wilhelm, Heinsheim, Heinrich Hartmann, Limburgerhof, and Albrecht Eckell, Frankenthal, Germany, assignors to Badische Anilin- & Soda-Fabrik Aktiengesellschaft, Ludwigshafen (Rhine), Germany
No Drawing. Filed June 3, 1969, Ser. No. 830,092
Claims priority, application Germany, June 6, 1968, P 17 70 578.1
Int. Cl. C08f 15/38, 45/60
U.S. Cl. 260—47 UA                                    8 Claims

ABSTRACT OF THE DISCLOSURE

Copolymers which do not become yellow at all or only become yellow after a long time and which are based on butadiene and/or carboxylic nitriles copolymerizable therewith and contain small amounts of a colored compound which absorbs light in the wavelength range from 570 to 605 millimicrons and which bears at least one copolymerizable group.

---

It is known that copolymers which contain nitriles of polymerizable carboxylic acids and/or butadiene tend to form yellow degradation products in the light. Such a yellow coloration militates against the use of copolymers containing for example acrylonitrile or methacrylonitrile and/or butadiene in a large number of fields. Among these are for example textile finishing, the production of nonwoven fabrics, and leather dressing. Attempts have been made to avoid this disadvantage by adding to such copolymers compounds which filter out certain wavelengths of light in the ultraviolet range and thus impart a certain protection to the copolymer. The use of such agents known as ultraviolet absorbers has however not been generally adopted because they absorb only in quite definite narrow wavelength ranges and therefore absorb only a portion of the injurious rays.

Moreover the ultraviolet absorbers are merely mixed with the copolymers. They can therefore be dissolved out by solvents so that the material is no longer protected.

We have now found that copolymers of butadiene and/or nitriles of polymerizable carboxylic acid and other comonomers do not become yellow at all or only become yellow after a very long time, when they have been prepared from:

(a) 95 to 5% by weight of butadiene and/or a nitrile of a polymerizable carboxylic acid;
(b) 5 to 95% by weight of one or more than one other comonomer; and
(c) 2.5 to 50 p.p.m. of a copolymerizable colored compound which absorbs within the range of 570 to 605 millimicrons and which bears at least one copolymerizable group.

Copolymers which have been prepared from 90 to 10% by weight of acrylonitrile as comonomer (a), 10 to 90% by weight of comonomer (b), and 20 to 40 p.p.m. of compound (c) and copolymers prepared from 70 to 20% by weight of butadiene as comonomer (a), 30 to 80% by weight of comonomer (b), and 20 to 40 p.p.m. of compound (a) are preferred.

Examples of such colored compounds (c) are blue to violet dyes of the azo and anthraquinone series which have at least one polymerizable double bond in the molecule. Those colored copolymerizable compounds are preferably used in which the polymerizable group is present in the form of an acryloyl or methacryloyl group.

A number of the colored copolymerizable compounds (c) are given below but this list of examples is to be regarded as representative and not exhaustive:

(1) 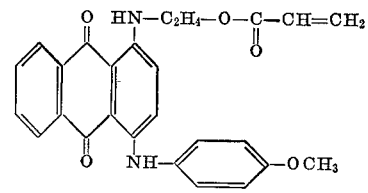

(2) 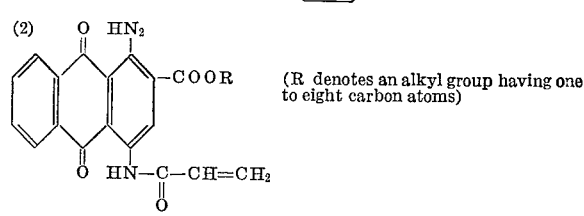
(R denotes an alkyl group having one to eight carbon atoms)

(3) 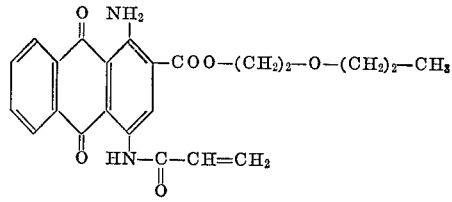

(4) 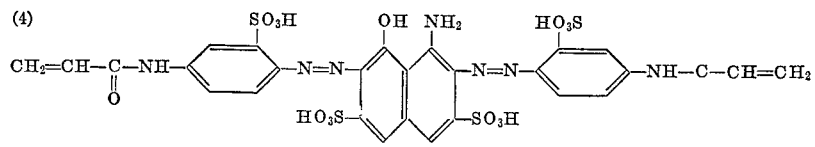

(5) 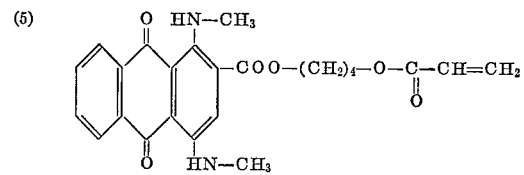

The amount of comonomers (c) in the copolymer is preferably from 5 to 40 p.p.m. with reference to the comonomers (a) and (b).

Examples of nitriles of polymerizable carboxylic acids are the nitriles of crotonic acid, methylenemalonic acid and particularly acrylic and methacrylic acids.

Examples of comonomers (b) are compounds conventionally used industrially for the synthesis of polymeric coating and finishing agents, for example styrene, vinyl chloride, vinylidene chloride, the alkyl esters of acrylic acid, methacrylic acid and maleic acid with from one to eighteen carbon atoms in the alkyl radical, vinyllactams such as vinylpyrrolidone, vinylcaprolactam, vinylamines such as vinylimidazole, polymerizable carboxylic acids such as acrylic acid, methacrylic acid and maleic acid, their anhydrides such as acrylic anhydride and maleic anhydride, and their amides such as acrylamide and methacrylamide.

Comonomers bearing groups which cause crosslinking may also be present in the copolymers according to the invention in amounts of from 2 to 30% by weight with reference to the total amount of monomers. These polymers, depending on the type of crosslinkable groups, may either react with themselves (i.e. crosslink directly) or indirectly with compounds bearing complementary groups. Comonomers having groups which can be crosslinked direct by condensation are particularly N-methylol and N-alkoxymethyl derivatives of acrylamide and methacrylamide, of N-acryloylurea, of acryloylglyoxalmonoureine and of N-acryloylglyoxaldiureine. The alkoxy radicals in the said compounds should preferably contain from one to four carbon atoms; the methoxy and butoxy groups are preferred.

Acrylamide and methacrylamide are particularly suitable for indirect crosslinking by condensation. Acrylic acid, methacrylic acid, oxyalkylacrylates such as butanediol monoacrylate and ethylene glycol monoacrylate, polymerizable epoxide compounds such as acrylic acid glycide esters and polymerizable isocyanates such as vinyl isocyanate are particularly suitable for indirect crosslinking by addition.

The copolymers may be prepared by known methods of free-radical initiated copolymerization by bulk, solution or precipitation polymerization but preferably by emulsion polymerization in aqueous medium. In the latter case dispersions of low viscosity are obtained which may be used directly.

Films, coatings and laminations of all types can be prepared with these polymers; they no longer tend to become yellow in the light or do not show this tendency until after a very long time.

The invention is illustrated by the following examples, in which parts and percentages are by weight.

EXAMPLE 1

Copolymers are prepared from the following compounds by precipitation polymerization in butyl acetate:

(I) 90% of acrylonitrile and 10% of acrylamide;
(II) 90% of acrylonitrile, 10% of acrylamide and 40 p.p.m. of the dye having the Formula 3:

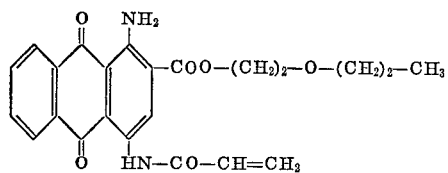

Both samples are exposed in powder form to daylight for a long period.

Sample (I) exhibits a marked yellow tinge after only three days.

Sample (II) is still unchanged after eight weeks.

If one of the dyes (1), (2), (4) and (5) is used instead of dye (3), polymers are obtained which have the same properties as polymer (II).

EXAMPLE 2

Copolymers are prepared from the following compounds by precipitation polymerization in butyl acetate:

80% of acrylonitrile and 20% of methyl methacrylate;
70% of acrylonitrile and 30% of methacrylamide;
80% of acrylonitrile and 20% of styrene.

The experiments are repeated but with an addition of 40 p.p.m. of the dye having the Formula 3.

All three unmodified copolymers exhibit a marked yellow tinge after only three days in normal daylight.

The modified samples are unchanged.

If one of the dyes (1), (2), (4) and (5) is used instead of the dye (3), polymers are obtained which have the same properties as the polymers modified with dye (3).

EXAMPLE 3

A 40% aqueous copolymer emulsion is prepared in known manner by copolymerization of a mixture of 70 parts of butadiene, 30 parts of acrylonitrile and 1 part of acrylic acid in the presence of 4 parts of the sodium salt of a $C_{13}$ to $C_{17}$ alkylsulfonic acid as emulsifier and 1 part of potassium persulfate as initiator in 150 parts of water. A film is prepared from the copolymer.

Further dispersions having the same composition are prepared except that they contain 40 p.p.m. of dye (1), (2), (3), (4) or (5) (with reference to the monomers). Films are prepared from these copolymers as well.

The film from the unmodified copolymer has become distinctly yellow after only two days, whereas the modified copolymers give films which do not change in color.

EXAMPLE 4

A 40% aqueous copolymer emulsion is prepared in known manner by copolymerization of a mixture of 22 parts of acrylonitrile, 3 parts of N-methylolmethacrylamide, 2 parts of acrylic acid, 30 parts of ethyl acrylate and 43 parts of butyl acrylate in the presence of 1 part of the sodium salt of the sulfonated reaction product of isooctylphenol with 25 moles of ethylene oxide as emulsifier and 1 part of potassium persulfate as initiator in 150 parts of water.

A film is prepared from this copolymer.

The experiment is repeated but 30 p.p.m. (with reference to the monomers) of dye (3) is added prior to polymerization. A film is prepared from the copolymer emulsion obtained.

Whereas the film from the unmodified copolymer has become distinctly yellow after only two days, the film prepared from the modified copolymer emulsion is still unchanged.

Copolymers having the same good properties are obtained if one of the dyes (1), (2), (4) and (5) is used instead of dye (3).

EXAMPLE 5

A 40% aqueous copolymer emulsion is prepared, in a manner analogous to that described in Example 4, from 28 parts of butadiene, 30 parts of styrene, 37 parts of butyl acrylate, 3 parts of acrylamide and 2 parts of methacrylic acid.

The experiment is repeated five times, 30 p.p.m. (with reference to the monomers) of dye (1), (2), (3), (4) or (5) being added in each case prior to polymerization.

A film is prepared from each of the copolymer emulsions. Whereas the film from the unmodified copolymer has become distinctly yellow after only two days, the films prepared from the modified copolymers are still unchanged.

EXAMPLE 6

A copolymer emulsion having a solids content of 40% is prepared by a conventional method from 63 parts of butyl acrylate, 10 parts of styrene, 10 parts of ethyl acrylate, 10 parts of acrylonitrile, 3 parts of methacrylamide, 1 part of acrylic acid, 1 part of vinylpyrrolidone, 1 part of N-methylolmethacrylamide, 2 parts of methacrylic acid and 35 p.p.m. of dye (3) (with reference to the monomers) in 150 parts of water in the presence of 1 part of potassium persulfate as initiator and 2.0 parts of the sulfonated reaction product of 25 moles of ethylene oxide and isooctylphenol as emulsifier. A film prepared from the copolymer emulsion does not exhibit any yellowing after having been exposed to daylight for four months.

Films prepared from copolymer emulsions containing the same amount of dye (1), (2), (4) or (5) has the same properties, whereas a film prepared from the unmodified copolymer dispersion exhibits a distinct yellow tinge after only two weeks.

EXAMPLE 7

The same good result is obtained with a copolymer dispersion which has been prepared analogously to Example 4 but has the following composition: 45 parts of butyl acrylate, 22 parts of butadiene, 8 parts of acrylonitrile, 5 parts of vinylidene chloride, 5 parts of methacrylic acid, 4 parts of styrene, 1 part of methacrylamide, 10 parts of ethyl methacrylate and 28 p.p.m. (with reference to the monomers) of dye (1), (2), (3), (4) or (5).

We claim:

1. A copolymer resistant to yellowing which contains as polymerized components
   (a) from 95 to 5% by weight of units of a comonomer selected from the group consisting of butadiene and a nitrile of a polymerizable ethylenically unsaturated carboxylic acid;
   (b) from 5 to 95% by weight of units of at least one other ethylenically unsaturated monomer and
   (c) from 2.5 to 50 p.p.m., with reference to the weight of components (a) and (b), of units of a copolymerizable colored compound selected from the class consisting of blue to violet dyes of the azo and anthraquinone series which have at least one polymerizable double bond in the molecule, said compound absorbing light in the wavelength range from 570 to 605 millimicrons.

2. A copolymer as claimed in claim 1 which contains from 90 to 10% by weight of acrylonitrile units as comonomer (a), from 10 to 90% by weight of units of a comonomer (b), and from 20 to 40 p.p.m. of units of a comonomer (c).

3. A copolymer as claimed in claim 1 which contains from 70 to 20% by weight of butadiene units as comonomer (a), from 30 to 80% by weight of units of a comonomer (b), and from 20 to 40 p.p.m. of units of a comonomer (c).

4. A copolymer as claimed in claim 1 wherein the comonomer (c) contains one copolymerizable group.

5. A copolymer as claimed in claim 4 wherein the copolymerizable group in the comonomer (c) is an acryloyl or methacrylol group.

6. A copolymer as claimed in claim 1 wherein the comonomer (b) is a copolymerizable olefinically unsaturated compound selected from the group consisting of styrene, vinyl chloride, vinylidene chloride, alkyl esters of acrylic, methacrylic and maleic acids with from one to eighteen carbon atoms in the alkyl radical, vinyl esters of carboxylic acids having from one to twenty-four carbon atoms in the alkyl radical of the carboxylic acid, N-vinylpyrrolidone, N-vinylcaprolactam, vinylimidazole, acrylic acid, methacrylic acid, maleic acid, maleic anhydride, acrylamide and methacrylamide.

7. A copolymer as claimed in claim 1 comprising from 2 to 30% by weight, with reference to the total amount of comonomers (a) and (b), of a comonomer (b) containing groups capable of crosslinking directly with each other or indirectly by reaction with a compound having complementary reactive groups.

8. A copolymer as claimed in claim 7 wherein the comonomer (b) which is capable of being crosslinked is a compound selected from the group consisting of N-methylol and N-alkoxymethyl derivatives of acrylamide, methacrylamide, N-acryloylurea, acryloylglyoxalmonoureine or acryloylglyoxaldiureine.

References Cited

UNITED STATES PATENTS

| 3,120,564 | 2/1964 | Milionis | 260—562 |
| 3,173,893 | 3/1965 | Fertig et al. | 260—62 |
| 3,503,918 | 3/1970 | Le Sota et al. | 260—29.7 |
| 3,190,860 | 6/1965 | Fertig et al. | 260—80.73 |
| 3,522,188 | 7/1970 | Strobel et al. | 252—300 |

JOSEPH L. SCHOFER, Primary Examiner

J. KIGHT III, Assistant Examiner

U.S. Cl. X.R.

8—115.6; 252—300, 401, 404; 260—45.8 N, 78.5 N, 80.7, 80.73, 82.1, 83.5, 83.7, 85.5 R

PO-1050
(5/69)

UNITED STATES PATENT OFFICE
CERTIFICATE OF CORRECTION

Patent No. 3,637,596            Dated January 25, 1972

Inventor(s) Klaus Gulbins et al

It is certified that error appears in the above-identified patent and that said Letters Patent are hereby corrected as shown below:

Column 2, line 22, that portion of the formula reading "$HN_2$" should read -- $NH_2$ --; line 43, that portion of the formula reading "$NH-C-CH=CH_2$" should read -- $NH-\underset{O}{\overset{\|}{C}}-CH=CH_2$ --.

Column 3, line 23, "glyc-" should read -- gly- --.

Signed and sealed this 27th day of June 1972.

(SEAL)
Attest:

EDWARD M. FLETCHER, JR.           ROBERT GOTTSCHALK
Attesting Officer                   Commissioner of Patents